United States Patent
Lesso

(10) Patent No.: US 11,693,939 B2
(45) Date of Patent: Jul. 4, 2023

(54) EAR PROXIMITY DETECTION

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 165 days.

(21) Appl. No.: 17/036,223

(22) Filed: Sep. 29, 2020

(65) Prior Publication Data

US 2021/0064729 A1 Mar. 4, 2021

Related U.S. Application Data

(63) Continuation of application No. 15/927,824, filed on Mar. 21, 2018, now Pat. No. 10,810,291.

(51) Int. Cl.
*G06F 21/00* (2013.01)
*G06F 21/32* (2013.01)
*H04M 1/60* (2006.01)
*H04M 1/72454* (2021.01)
*H04M 1/67* (2006.01)

(52) U.S. Cl.
CPC ............ *G06F 21/32* (2013.01); *H04M 1/605* (2013.01); *H04M 1/72454* (2021.01); *H04M 1/67* (2013.01)

(58) Field of Classification Search
CPC ... G06F 21/32; H04M 1/605; H04M 1/72454; H04M 1/67; H04M 1/72448; H04M 1/725; H04R 1/1041; H04R 1/10; G01S 5/04; G01S 15/04
See application file for complete search history.

(56) References Cited

U.S. PATENT DOCUMENTS 8,187,202 B2 5/2012 Akkermans et al.
9,706,304 B1 * 7/2017 Kelso .................. H03G 3/3005
(Continued)

FOREIGN PATENT DOCUMENTS

CN 102293013 A 12/2011
CN 104080028 A 10/2014
(Continued)

OTHER PUBLICATIONS

Combined Search and Examination Report under Sections 17 and 18(3), UKIPO, Application No. GB1806967.4, dated Oct. 4, 2018.
(Continued)

*Primary Examiner* — Jeffrey C Pwu
*Assistant Examiner* — William A Corum, Jr.
(74) *Attorney, Agent, or Firm* — Jackson Walker L.L.P.

(57) ABSTRACT

Embodiments of the disclosure include methods, apparatus and computer programs for detecting the proximity of an ear to an audio device. In one embodiment, the disclosure provides a system for detecting the presence of an ear in proximity to an audio device. The system comprises: an input for obtaining a data signal from the environment of the audio device; and an ear biometric authentication module configured to: compare one or more ear biometric features, extracted from the data signal, to an ear biometric template; and generate a first output indicative of the presence or absence of any ear in proximity to the audio device based on the comparison of the one or more extracted ear biometric features to the ear biometric template.

17 Claims, 10 Drawing Sheets

(56) References Cited

U.S. PATENT DOCUMENTS

| | | |
|---|---|---|
| 9,838,812 B1 | 12/2017 | Shetye et al. |
| 2009/0003641 A1 | 1/2009 | Van Der Bilt |
| 2009/0060240 A1 | 3/2009 | Coughlan et al. |
| 2009/0087003 A1 | 4/2009 | Zurek et al. |
| 2013/0019292 A1 | 1/2013 | Varshavsky et al. |
| 2015/0172827 A1 | 6/2015 | Sharpe et al. |
| 2015/0296310 A1 | 10/2015 | Chen et al. |
| 2016/0360314 A1 | 12/2016 | Iyengar et al. |
| 2017/0013345 A1 | 1/2017 | Kumar et al. |
| 2017/0347180 A1* | 11/2017 | Petrank .................. G06F 3/165 |
| 2018/0075724 A1* | 3/2018 | Steiner .................. G08B 21/12 |
| 2019/0189129 A1* | 6/2019 | Arakawa ................ G10L 25/06 |
| 2020/0184057 A1* | 6/2020 | Mukund ............... H04W 12/06 |
| 2021/0103646 A1* | 4/2021 | Koshinaka ............. G06F 21/32 |

FOREIGN PATENT DOCUMENTS

| | | |
|---|---|---|
| CN | 104704801 A | 6/2015 |
| CN | 109196879 A | 1/2019 |
| EP | 1465454 A2 | 10/2004 |
| EP | 2704052 A1 | 3/2014 |
| WO | 2014061578 A1 | 4/2014 |

OTHER PUBLICATIONS

International Search Report and Written Opinion of the International Searching Authority, International Application No. PCT/GB2019/050790, dated May 28, 2019.

First Office Action, China National Intellectual Property Administration, Application No. 2019800203651, dated Apr. 1, 2021.

Search Report, China National Intellectual Property Administration, Application No. 2019800203651, dated Mar. 26, 2021.

\* cited by examiner

EAR PROXIMITY DETECTION

This application is a continuation of U.S. patent application Ser. No. 15/927,824, filed Mar. 21, 2018, which is incorporated by reference herein in its entirety.

TECHNICAL FIELD

Embodiments of the present disclosure relate to apparatus, systems, methods and computer programs for ear proximity detection. In particular, embodiments of the present disclosure relate to apparatus, systems, methods and computer programs for detecting the presence or absence of an ear in proximity to an audio device.

BACKGROUND

It is known that the acoustic properties of a user's ear, whether the outer parts (known as the pinna or auricle), the ear canal or both, differ substantially between individuals and can therefore be used as a biometric to identify the user. One method for achieving this is for one or more loudspeakers (or similar transducers) positioned close to or within the ear to generate an acoustic stimulus, and one or more microphones similarly positioned close to or within the ear to detect the acoustic response of the ear to the acoustic stimulus. One or more features may be extracted from the response signal, and used to characterize the individual.

For example, the ear canal is a resonant system, and therefore one feature which may be extracted from the response signal is the resonant frequency of the ear canal. If the measured resonant frequency (i.e. in the response signal) differs from a stored resonant frequency for the user, a biometric algorithm coupled to receive and analyse the response signal may return a negative result. Other features of the response signal may be similarly extracted and used to characterize the individual. For example, the features may comprise one or more mel frequency cepstrum coefficients. More generally, the transfer function between the acoustic stimulus and the measured response signal (or features of the transfer function) may be determined, and compared to a stored transfer function (or stored features of the transfer function) which is characteristic of the user.

The acoustic stimulus may be generated and the response measured using a personal audio device, such as earphones, headphones or a mobile phone. Power consumption is of critical importance in such personal audio devices, as space is limited and thus battery size is also limited. The battery lifetime between consecutive charges is a key performance indicator for users when selecting a device.

In order to reduce power consumption, many personal audio devices have a dedicated "in-ear detect" function, operable to detect the presence or absence of an ear in proximity to the device. If no ear is detected, the device may be placed in a low-power state in order to conserve power; if an ear is detected, the device may be placed in a relatively high-power state.

In-ear detect functions may also be used for other purposes. For example, a mobile phone may utilize an in-ear detect function to lock a touchscreen when the phone is placed close to the user's ear, in order to prevent inadvertent touch input while on a call. For example, a personal audio device may pause audio playback responsive to detection of the personal audio device being removed from the user's ears, or un-pause audio upon detection of the personal audio device being applied to the user's ears.

Various mechanisms for in-ear detect are known in the art. For example, infra-red sensors have been used in mobile phones to detect the proximity of an ear. Light sensors have been proposed to detect the insertion of earphones and headphones into or onto a user's ears. However, all of these mechanisms suffer from the drawback that they require additional hardware in the device for the purposes of in-ear detect. Additional sensors may be required, and/or additional processing circuitry for processing of the sensor output signals.

SUMMARY

Apparatus, systems, methods and computer programs for ear proximity detection are proposed, which attempt to alleviate or mitigate one or more of the problems set out above.

In a first aspect, there is provided a system for detecting the presence of an ear in proximity to an audio device. The system comprises: an input for obtaining a data signal from the environment of the audio device; and an ear biometric authentication module configured to: compare one or more ear biometric features, extracted from the data signal, to an ear biometric template; and generate a first output indicative of the presence or absence of any ear in proximity to the audio device based on the comparison of the one or more extracted ear biometric features to the ear biometric template.

A further aspect provides an electronic device, comprising the system recited above.

Another aspect of the disclosure provides a method of detecting the presence of an ear in proximity to an audio device. The method comprises: obtaining a data signal from the environment of the audio device; extracting one or more ear biometric features from the data signal; comparing the one or more extracted ear biometric features to an ear biometric template for an authorised user of the audio device; and generating a first output indicative of the presence or absence of any ear in proximity to the audio device based on the comparison of the one or more extracted ear biometric features to the ear biometric template for the authorised user.

A further aspect provides an electronic apparatus comprising processing circuitry and a non-transitory machine-readable medium storing instructions which, when executed by the processing circuitry, cause the electronic apparatus to implement a method as recited above.

Another aspect provides a non-transitory machine-readable medium storing instructions which, when executed by processing circuitry, cause an electronic apparatus to implement a method as recited above.

A further aspect of the disclosure provides a system for detecting the presence of an ear in proximity to an audio device. The system comprises: an input for obtaining a data signal from the environment of the audio device; and an ear biometric authentication module configured to: extract one or more first ear biometric features from a first number of data frames of the data signal; calculate a first score being indicative of a distance between the one or more extracted ear biometric features and an ear biometric template of an authorised user; compare the first score to a first threshold to determine the presence or absence of any ear in proximity to the audio device; responsive to a determination of the presence of any ear in proximity to the audio device, extract one or more second ear biometric features from a second number of data frames of the data signal, the second number of data frames being greater than the first number of data frames; calculate a second score being indicative of a distance between the one or more second extracted ear biometric features and the ear biometric template of the authorised user; and compare the second score to a second threshold, different from the first threshold, to determine the presence or absence of an ear of the authorised user in proximity to the audio device.

Another aspect of the disclosure provides a system for detecting the presence of an ear in proximity to an audio device. The system comprises: an input for obtaining a data signal from the environment of the audio device; and an ear biometric authentication module configured to: compare one or more ear biometric features, extracted from the data signal, to an ear biometric template of an authorised user; calculate one or more scores based on the comparison, the one or more scores being indicative of a distance between the one or more extracted ear biometric features and the ear biometric template; compare the one or more scores to first and second thresholds, wherein the first and second thresholds are different to each other; and generate a first output indicative of the presence or absence of any ear in proximity to the audio device based on the comparison of the one or more scores to the first threshold, and generate a second output indicative of the presence or absence of an ear of the authorised user in proximity to the audio device based on the comparison of the one or more scores to the second threshold.

Another aspect of the disclosure provides the use of a biometric processor for detecting the presence of any ear in proximity to an audio device.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Embodiments of the present disclosure provide apparatus, systems, methods and computer programs for ear proximity detection. In particular, the embodiments utilize a biometric process, based on one or more ear biometric features, to detect the presence or absence of an ear from the vicinity of a personal audio device.

As used herein, the term "personal audio device" is any electronic device which is suitable for, or configurable to, provide audio playback substantially to only a single user. Some examples of suitable personal audio devices are shown in FIGS. 1a to 1e.

Figure 1A:
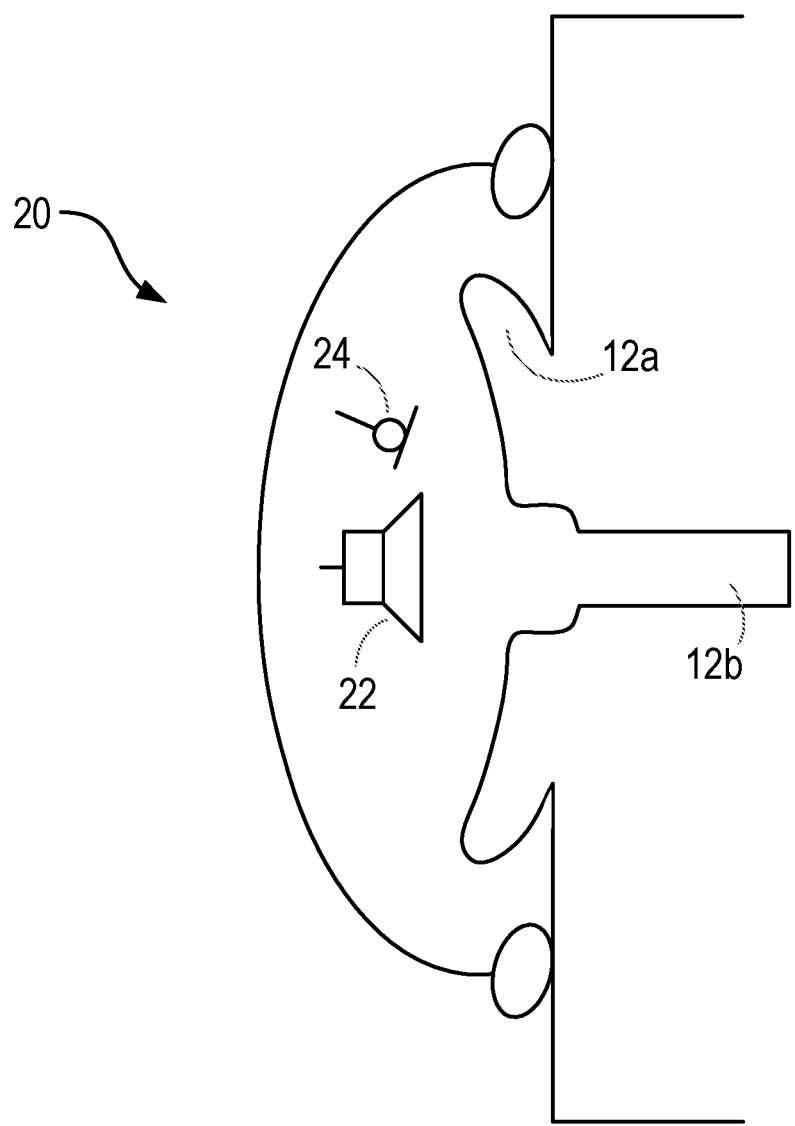
FIGS. 1a to 1e show examples of personal audio devices.

FIG. 1a shows a schematic diagram of a user's ear, comprising the (external) pinna or auricle 12a, and the (internal) ear canal 12b. A personal audio device 20 comprising a circum-aural headphone is worn by the user over the ear. The headphone comprises a shell which substantially surrounds and encloses the auricle 12a, so as to provide a physical barrier between the user's ear and the external environment. Cushioning or padding may be provided at an edge of the shell, so as to increase the comfort of the user, and also the acoustic coupling between the headphone and the user's skin (i.e. to provide a more effective barrier between the external environment and the user's ear).

The headphone comprises one or more loudspeakers 22 positioned on an internal surface of the headphone, and arranged to generate acoustic signals towards the user's ear and particularly the ear canal 12b. The headphone further comprises one or more microphones 24, also positioned on the internal surface of the headphone, arranged to detect acoustic signals within the internal volume defined by the headphone, the auricle 12a and the ear canal 12b.

The headphone may be able to perform active noise cancellation, to reduce the amount of noise experienced by the user of the headphone. Active noise cancellation operates by detecting a noise (i.e. with a microphone), and generating a signal (i.e. with a loudspeaker) that has the same amplitude as the noise signal but is opposite in phase. The generated signal thus interferes destructively with the noise and so lessens the noise experienced by the user. Active noise cancellation may operate on the basis of feedback signals, feedforward signals, or a combination of both. Feedforward active noise cancellation utilizes one or more microphones on an external surface of the headphone, operative to detect the environmental noise before it reaches the user's ear. The detected noise is processed quickly, and the cancellation signal generated so as to match the incoming noise as it arrives at the user's ear. Feedback active noise cancellation utilizes one or more error microphones positioned on the internal surface of the headphone, operative to detect the combination of the noise and the audio playback signal generated by the one or more loudspeakers. This combination is used in a feedback loop, together with knowledge of the audio playback signal, to adjust the cancelling signal generated by the loudspeaker and so reduce the noise. The microphone 24 shown in FIG. 1a may therefore form part of an active noise cancellation system, for example, as an error microphone.

Figure 1B:
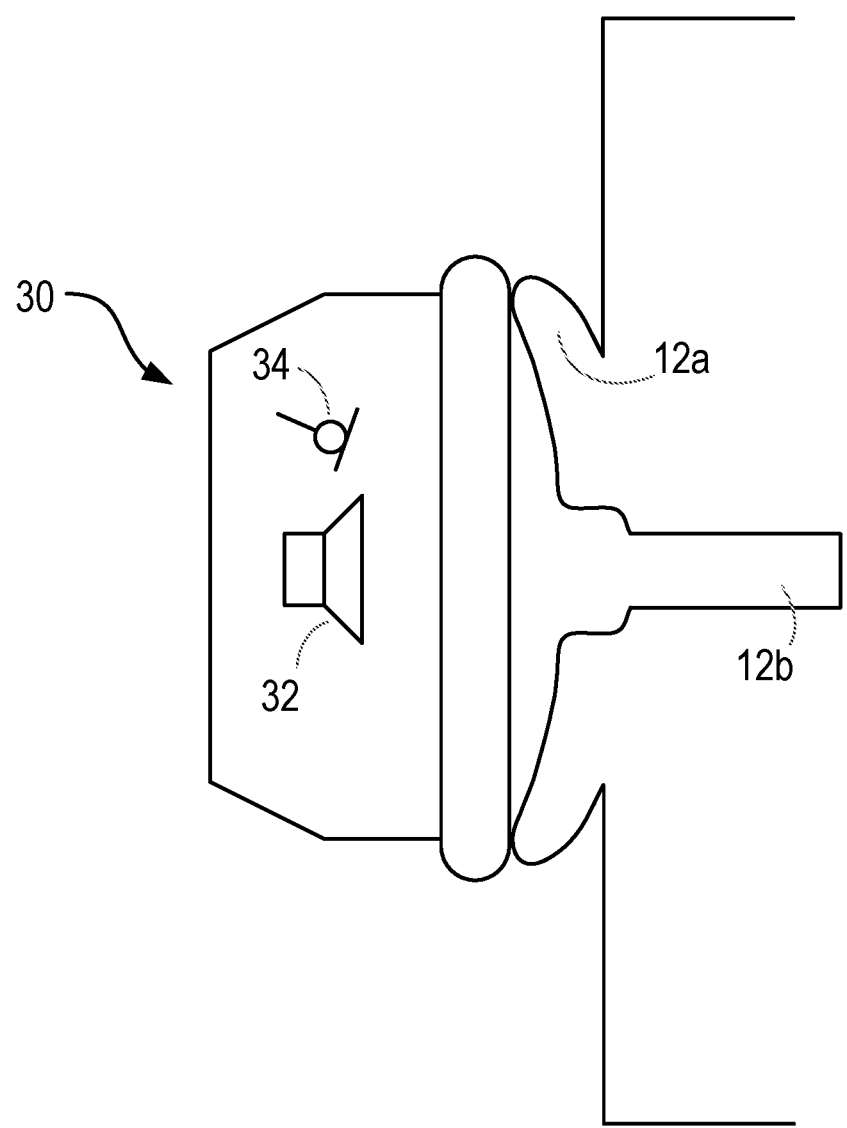

FIG. 1b shows an alternative personal audio device 30, comprising a supra-aural headphone. The supra-aural headphone does not surround or enclose the user's ear, but rather sits on the auricle 12a. The headphone may comprise a cushion or padding to lessen the impact of environmental noise. As with the circum-aural headphone shown in FIG. 1a, the supra-aural headphone comprises one or more loudspeakers 32 and one or more microphones 34. The loudspeaker(s) 32 and the microphone(s) 34 may form part of an active noise cancellation system, with the microphone 34 serving as an error microphone.

Figure 1C:
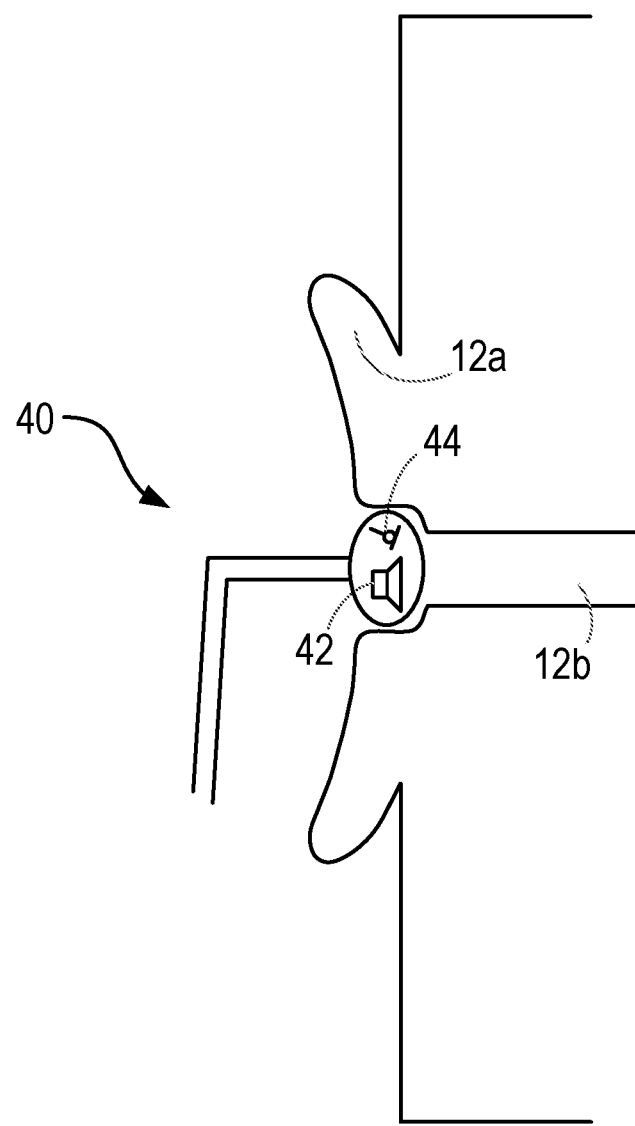

FIG. 1c shows a further alternative personal audio device 40, comprising an intra-concha headphone (or earphone). In use, the intra-concha headphone sits inside the user's concha cavity. The intra-concha headphone may fit loosely within the cavity, allowing the flow of air into and out of the user's ear canal 12b.

As with the devices shown in FIGS. 1a and 1b, the intra-concha headphone comprises one or more loudspeakers 42 and one or more microphones 44, which may form part of an active noise cancellation system.

Figure 1D:
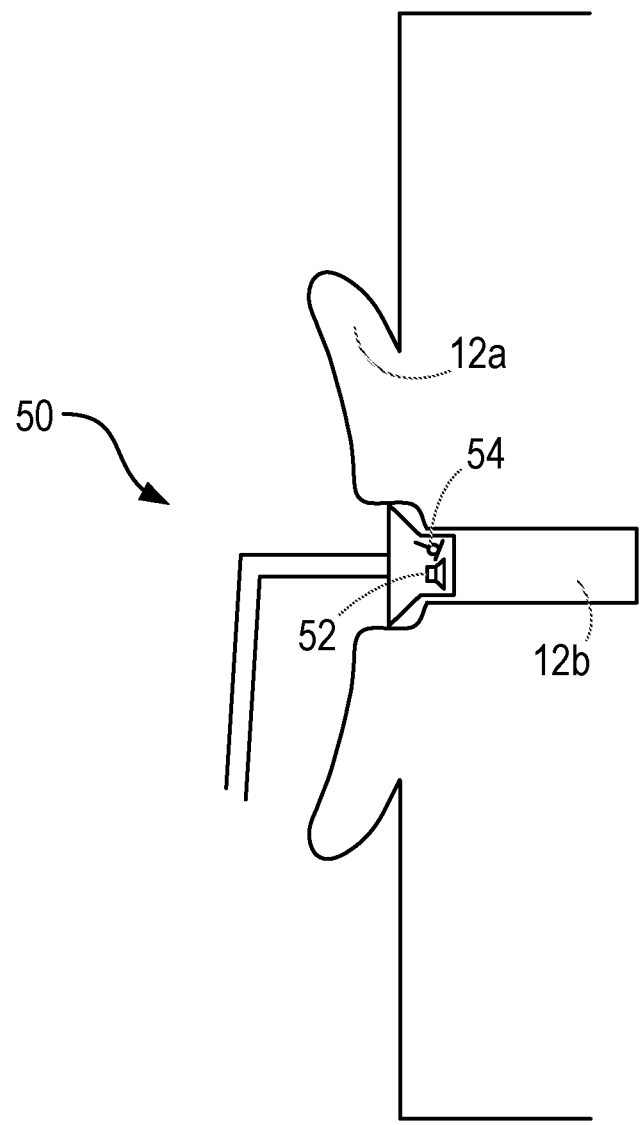

FIG. 1d shows a further alternative personal audio device 50, comprising an in-ear headphone (or earphone), insert headphone, or ear bud. This headphone is configured to be partially or totally inserted within the ear canal 12b, and may provide a relatively tight seal between the ear canal 12b and the external environment (i.e. it may be acoustically closed or sealed). The headphone may comprise one or more loudspeakers 52 and one or more microphones 54, as with the others devices described above, and these components may form part of an active noise cancellation system.

As the in-ear headphone may provide a relatively tight acoustic seal around the ear canal 12b, external noise (i.e. coming from the environment outside) detected by the microphone 54 is likely to be low.

Figure 1E:
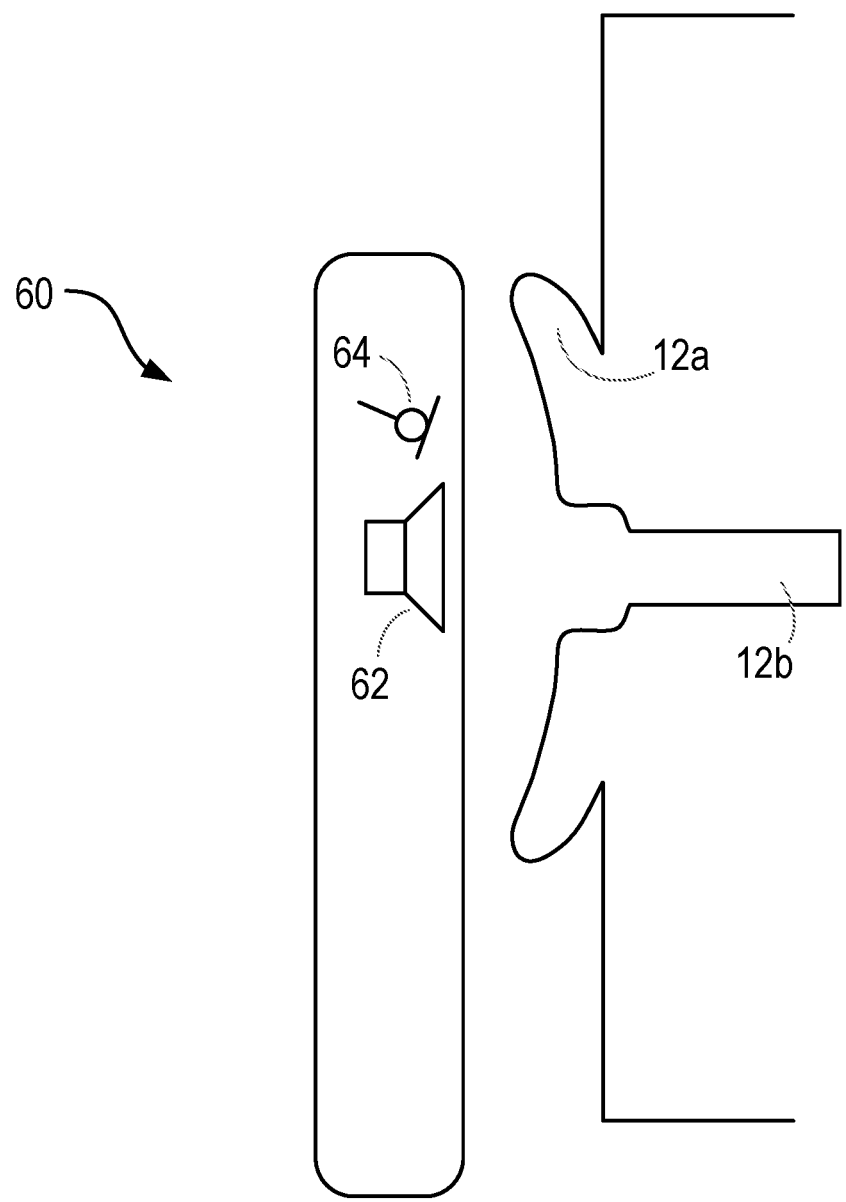

FIG. 1e shows a further alternative personal audio device 60, which is a mobile or cellular phone or handset. The handset 60 comprises one or more loudspeakers 62 for audio playback to the user, and one or more microphones 64 which are similarly positioned.

In use, the handset 60 is held close to the user's ear so as to provide audio playback (e.g. during a call). While a tight acoustic seal is not achieved between the handset 60 and the user's ear, the handset 60 is typically held close enough that an acoustic stimulus applied to the ear via the one or more loudspeakers 62 generates a response from the ear which can be detected by the one or more microphones 64. As with the other devices, the loudspeaker(s) 62 and microphone(s) 64 may form part of an active noise cancellation system.

All of the personal audio devices described above thus provide audio playback to substantially a single user in use. Each device comprises one or more loudspeakers and one or more microphones, which may be utilized to generate biometric data related to the user's ear. The loudspeaker is operable to generate an acoustic stimulus, or acoustic probing wave, towards the user's ear, and the microphone is operable to detect and measure a response of the user's ear to the acoustic stimulus, e.g. to measure acoustic waves reflected from the ear canal or the pinna, and/or to acquire other ear biometric data. The acoustic stimulus may be sonic (for example in the audio frequency range of say 20 Hz to 20 kHz) or ultra-sonic (for example greater than 20 kHz or in the range 20 kHz to 50 kHz) or near-ultrasonic (for example in the range 15 kHz to 25 kHz) in frequency. In some examples the microphone signal may be processed to measure received signals of the same frequency as that transmitted.

Another biometric marker may comprise otoacoustic noises emitted by the cochlear in response to the acoustic stimulus waveform. The otoacoustic response may comprise a mix of the frequencies in the input waveform. For example if the input acoustic stimulus consists of two tones at frequencies f1 and f2, the otoacoustic emission may include a component at frequency 2*f1-f2. The relative power of frequency components of the emitted waveform has been shown to be a useful biometric indicator. In some examples therefore the acoustic stimulus may comprise tones of two or more frequencies and the amplitude of mixing products at sums or differences of integer-multiple frequencies generated by otoacoustic emissions from the cochlear may be measured. Alternatively, otoacoustic emissions may be stimulated and measured by using stimulus waveforms comprising fast transients, e.g. clicks.

Depending on the construction and usage of the personal audio device, the measured response may comprise user-specific components, i.e. biometric data, relating to the auricle 12a, the ear canal 12b, or a combination of both the auricle 12a and the ear canal 12b. For example, the circumaural headphones shown in FIG. 1a will generally acquire data relating to the auricle 12a and potentially also the ear canal 12b. The insert headphones shown in FIG. 1d will generally acquire data relating only to the ear canal 12b.

One or more of the personal audio devices described above (or rather, the microphones within those devices) may be operable to detect bone-conducted voice signals from the user. That is, as the user speaks, sound is projected away from the user's mouth through the air. However, acoustic vibrations will also be carried through part of the user's skeleton or skull, such as the jaw bone. These acoustic vibrations may be coupled to the ear canal 12b through the jaw or some other part of the user's skeleton or skull, and detected by the microphone. Lower frequency sounds tend to experience a stronger coupling than higher frequency sounds, and voiced speech (i.e. that speech or those phonemes generated while the vocal cords are vibrating) is coupled more strongly via bone conduction than unvoiced speech (i.e. that speech or those phonemes generated while the vocal cords are not vibrating). The in-ear headphone 50 may be particularly suited to detecting bone-conducted speech owing to the tight acoustic coupling around the ear canal 12b.

A further ear biometric feature which may be extracted from audio signals acquired from a user's ear relates to cardiac sounds. That is, phono cardiograms have been shown to be useful in distinguishing between individuals. See, for example, "Biometric Identification Based on Frequency Analysis of Cardiac Sounds", by Beritelli and Serrano, IEEE Transactions on Information Forensics and Security (Volume 2, Issue 3, pages 596-604, 2007). One particular feature which may be useful as a biometric is the variability of the R-R interval (i.e. the period between successive R peaks, where R is a point corresponding to the peak of the QRS complex of the electrocardiogram wave).

All of the devices shown in FIGS. 1a to 1e and described above may be used to implement aspects of the disclosure.

Figure 2:
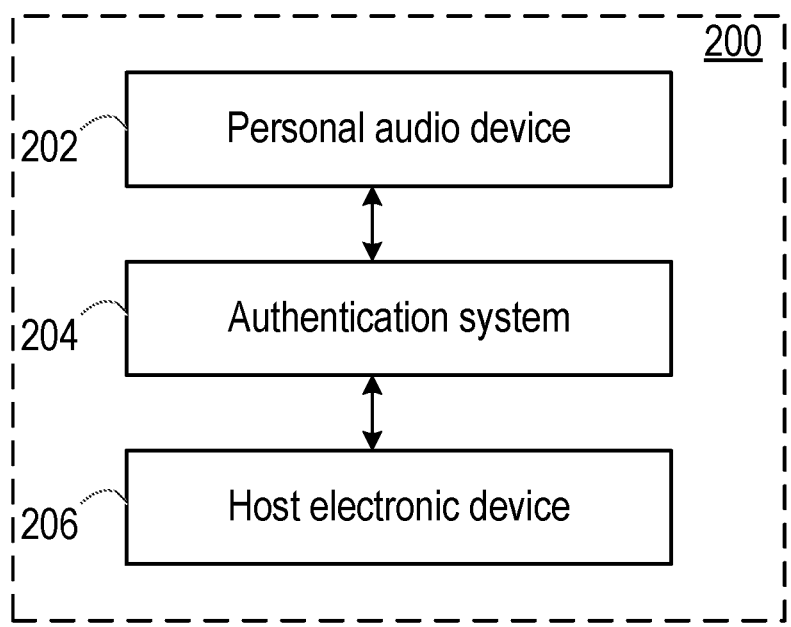
FIG. 2 shows an arrangement according to embodiments of the disclosure.

FIG. 2 shows an arrangement 200 according to embodiments of the disclosure. The arrangement 200 comprises a personal audio device 202, a biometric authentication system 204 and a host electronic device 206.

The personal audio device 202 may be any device which is suitable for, or configurable to provide audio playback to substantially a single user. The personal audio device 202 generally comprises one or more loudspeakers, and one or more microphones which, in use, are positioned adjacent to or within a user's ear. The personal audio device may be wearable, and comprise headphones for each of the user's ears. Alternatively, the personal audio device may be operable to be carried by the user, and held adjacent to the user's ear or ears during use. The personal audio device may comprise headphones or a mobile phone handset, as described above with respect to any of FIGS. 1a to 1e.

The host electronic device 206 may comprise any suitable audio playback device, configurable to generate audio playback signals to be played to the user via the personal audio device 202. It will be understood that, where the personal audio device 202 comprises a cellular phone or similar device for example, the host device 206 and the personal audio device 202 may be the same.

The biometric system 204 is coupled to both the personal audio device 202 and the host electronic device 206. In some embodiments, the biometric system 204 is provided in the personal audio device 202 itself. In other embodiments, the biometric system 204 is provided in the host electronic device 206. In still further embodiments, operations of the biometric device 204 are distributed between the personal audio device 202 and the host electronic device 206.

The biometric system 204 is coupled to the personal audio device 202 and operative to control the personal audio device 202 to acquire biometric data which is indicative of the individual using the personal audio device 202.

The personal audio device 202 may thus generate an acoustic stimulus for application to the user's ear, and detect or measure the response of the ear to the acoustic stimulus in order to acquire ear biometric data. For example, the acoustic stimulus may be in the sonic range, or ultra-sonic. In some embodiments, the acoustic stimulus may have a flat frequency spectrum over a relevant frequency range, or be preprocessed in such a way that those frequencies that allow for a good discrimination between individuals are emphasized (i.e. have a higher amplitude than other frequencies). The measured response corresponds to the reflected signal received at the one or more microphones, with certain frequencies being reflected at higher amplitudes than other frequencies owing to the particular response of the user's ear. Other forms of ear biometric data (such as heart rate variability and bone-conducted voice signals, for example) may require only the detection of an audio signal without a preceding acoustic stimulus.

The biometric system 204 may send suitable control signals to the personal audio device 202, so as to initiate the acquisition of biometric data, and receive data from the personal audio device 202 corresponding to the measured response. The biometric system 204 is operable to extract one or more features from the measured response and utilize those features as part of a biometric process.

Some examples of suitable biometric processes include biometric enrolment and biometric authentication. Enrolment comprises the acquisition and storage of biometric data which is characteristic of an individual. In the present context, such stored data may be known as an "ear print". Authentication (alternatively referred to as verification or identification) comprises the acquisition of biometric data from an individual, and the comparison of that data to the stored ear prints of one or more enrolled or authorised users. A positive comparison (i.e. a determination that the acquired data matches or is sufficiently close to a stored ear print) results in the individual being authenticated. For example, the individual may be permitted to carry out a restricted action, or granted access to a restricted area or device. A negative comparison (i.e. a determination that the acquired data does not match or is not sufficiently close to a stored ear print) results in the individual not being authenticated. For example, the individual may not be permitted to carry out the restricted action, or granted access to the restricted area or device.

Thus the biometric system 204 may provide an authentication result to the host electronic device 206 which, if the biometric result is positive and identifies the user as an authorised user, is then configured to permit or to perform one or more restricted actions.

According to embodiments of the disclosure, however, the authentication system 204 is further utilized to perform an in-ear detect function, i.e. to detect the presence or absence of an ear in proximity to the personal audio device. A positive indication that an ear is in proximity to the personal audio device may be used in a number of ways. For example, the indication may be provided to the personal audio device and used to alter the operative state of the personal audio device. The operative state may be changed from a relatively low-power state (e.g. a sleep state or unpowered state) to a relatively high-power state (e.g. activating a digital connection between the personal audio device 202 and the host device 206, activating audio playback in the personal audio device, etc). The indication may be provided to the host electronic device 206 for substantially the same purpose (e.g. to alter the operative state of the host electronic device 206, or to prompt the host electronic device to alter the operative state of the personal audio device 202), or for a different purpose (e.g. to lock a touchscreen to input, etc).

The authentication system 204 may perform a biometric authentication algorithm in order to detect the presence or absence of an ear in proximity to the personal audio device 202. This concept is explained more fully below.

Figure 3:
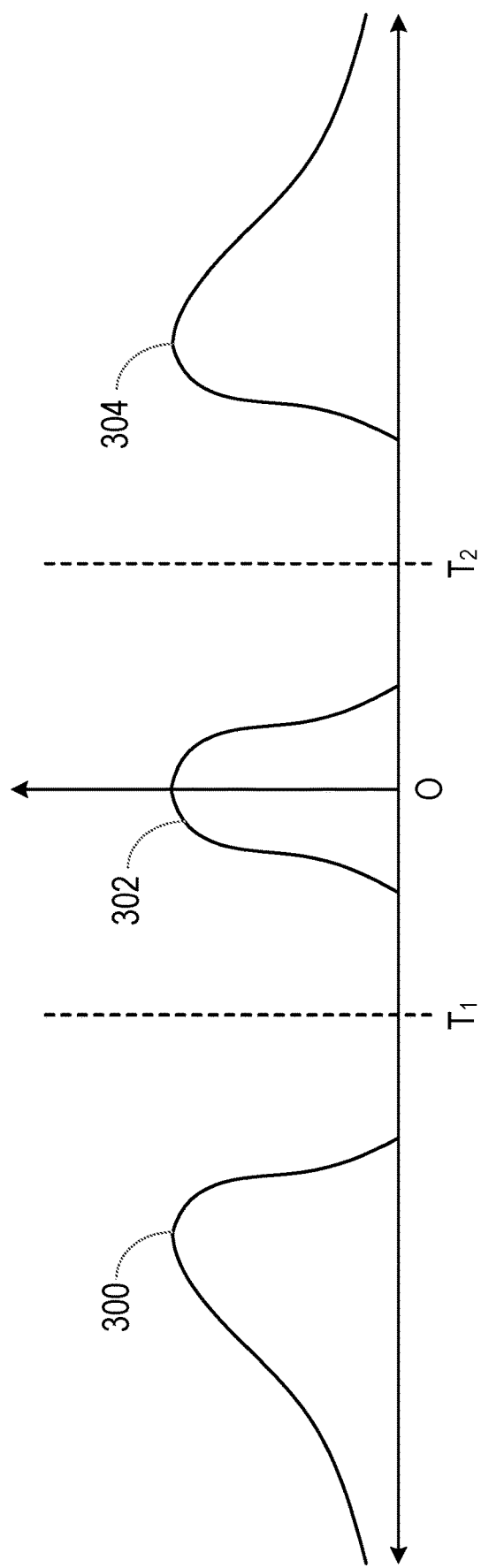
FIG. 3 is a schematic graph of biometric scores according to embodiments of the disclosure.

FIG. 3 is a schematic graph showing the distribution of biometric authentication scores.

As described above, biometric authentication in general involves the comparison of a biometric input signal (in particular, one or more features extracted from that input signal) to a stored template for an authorised user. The stored template is typically acquired during an "enrolment" process, as described above. Some biometric authentication processes may also involve the comparison of the biometric input signal (or features extracted therefrom) to a "universal model" descriptive of the biometrics of the population at large, as opposed to the specific authorised user. Some suitable examples of comparison techniques include probabilistic linear discriminant analysis (PLDA) and calculations of cosine similarity.

An output of the biometric authentication process is a score, indicative of the likelihood that the biometric input signals are those of the authorised user. For example, a relatively high score may be indicative of a relatively high likelihood that the biometric input signals match the authorised user; a relatively low score may be indicative of a relatively low likelihood that the biometric input signals match the authorised user. Biometric processors may make a decision on whether to authenticate a particular user as an authorised user or not by comparing the biometric score to a threshold value. For example, if the biometric score exceeds the threshold, the user may be authenticated; if the biometric score falls below the threshold, the user may not be authenticated. The value of the threshold may be constant, or may vary (e.g. as a function of the required level of security).

The inventors have realised that the distribution of biometric scores may be used to make further distinctions than merely whether or not a biometric input signal corresponds to an authorised user; the biometric score may be used to determine whether or not an ear is present at all. Further, as the biometric features of input signals indicative of any ear are substantially different from the biometric features of input signals indicative of no ear, a decision on the proximity of an ear to the personal audio device 202 can be reached quickly without consuming significant power.

Thus the distribution of biometric scores may fall into three categories 300, 302, 304. Relatively high biometric scores in category 304 may be indicative of a biometric input signal originating from an authorised user (i.e. a match). Relatively lower biometric scores 302 may be indicative of a biometric input signal originating from an unauthorised user (i.e. no match). The lowest biometric scores 300 may be indicative of a biometric input signal which does not correspond to an ear at all.

First and second thresholds may be set in order to distinguish between the three categories. For example, a first threshold $T_1$ may be set at a value which discriminates between biometric scores 300 indicative of no ear, and scores which are indicative of any ear 302, 304 (whether that ear belongs to an authorised user or not). A second threshold $T_2$ may be set at a value which discriminates between biometric scores 302 indicative of an unauthorised ear, and scores which are indicative of an authorised ear 304.

The values of the thresholds may be set using a machine learning algorithm, such as a neural network. Such machine learning algorithms may be subject to a training phase, in which training data is input to the algorithm. Training data may comprise biometric scores plus corresponding categorization of those scores as belonging to one of the three categories identified above (e.g. as determined by human input). One method of achieving this is for the machine learning algorithm to attempt to categorize training biometric scores into one of the categories, and then be provided with feedback (which may be positive or negative) according to whether the categorization is correct or not. This feedback may then be used to adjust the threshold values which are applied. Once the threshold values are correctly trained, they may be put into practice.

Various different ear biometric features have been discussed above, including ear resonances and anti-resonances, otoacoustic emissions, bone-conducted voice signals and heart rate variability. Biometric scores and corresponding categorizations or thresholds may be generated based on any one or more of these features.

In the latter case, where more than one ear biometric feature is used to categorize audio signals, different techniques may be utilized in order to fuse the different biometrics into a single process. Embodiments of the disclosure are not limited to any particular fusion technique.

In score-level fusion, separate biometric algorithms are applied to each ear biometric in order to generate multiple separate biometric scores. These scores are then consolidated. One method of achieving this is to generate a single scalar score which is subsequently compared to a scalar threshold (e.g., as shown in FIG. 3). For example, the cosine similarity may be calculated between a biometric measurement and a registered or pre-defined biometric template. Another method may take a vector of the multiple biometric scores, with the threshold then comprising a hyperplane which discriminates between the different categories in a multi-dimensional space.

In contrast, decision-level fusion consolidates multiple separate decisions from each biometric (i.e. based on separate biometric scores and separate thresholds for each biometric). Different rules may be determined for combining the multiple decisions in order to arrive at a single, overall decision as to the category of the input biometric signal.

Figure 4:
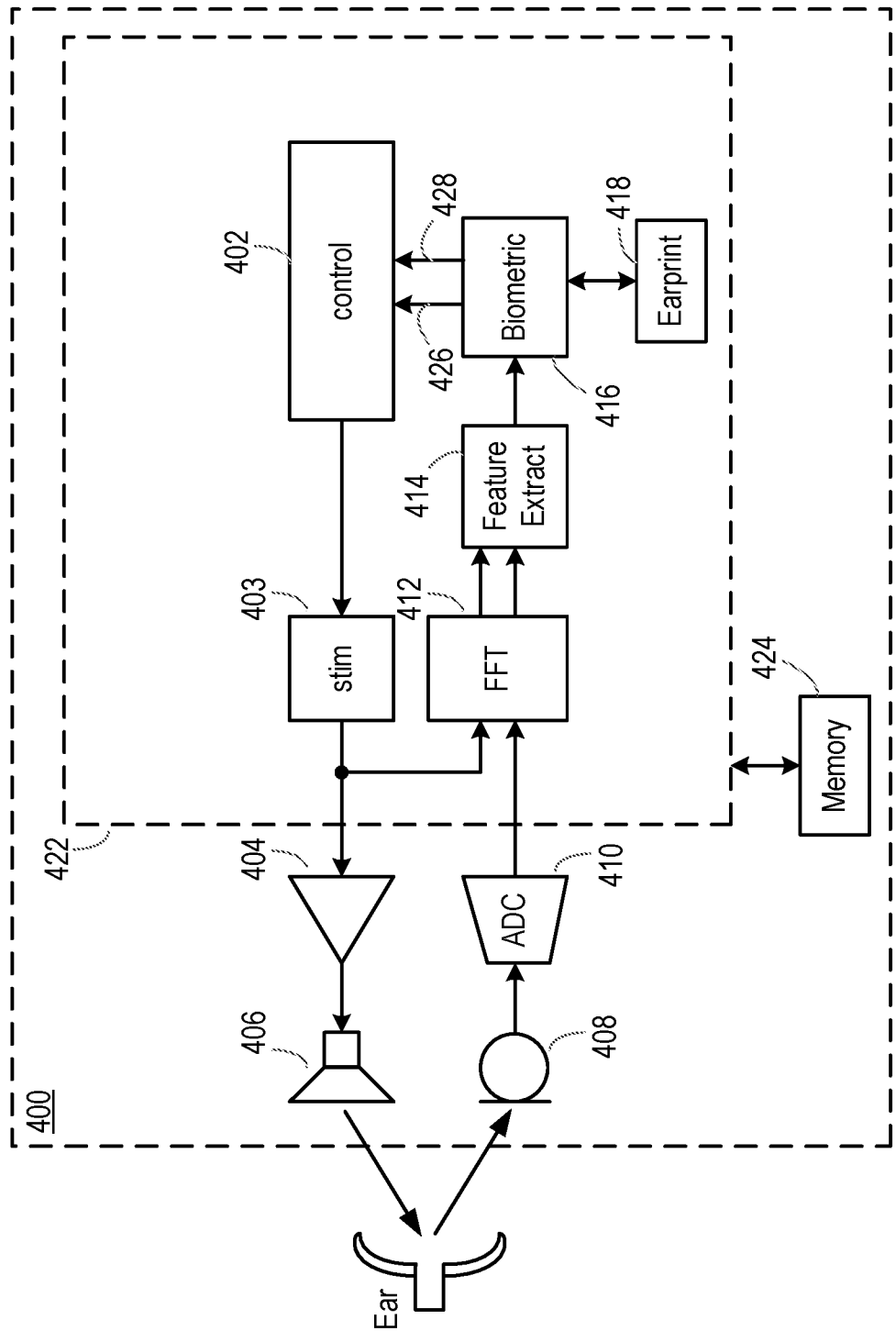
FIG. 4 shows a system according to embodiments of the disclosure.

FIG. 4 shows a system 400 according to embodiments of the disclosure.

The system 400 comprises processing circuitry 422, which may comprise one or more processors, such as a central processing unit or an applications processor (AP), or a digital signal processor (DSP). The one or more processors may perform methods as described herein on the basis of data and program instructions stored in memory 424. Memory 424 may be provided as a single component or as multiple components or co-integrated with at least some of processing circuitry 422. Specifically, the methods described herein can be performed in processing circuitry 422 by executing instructions that are stored in non-transient form in the memory 424, with the program instructions being stored either during manufacture of the system 400 or personal audio device 202 or by upload while the system or device is in use.

The processing circuitry 422 comprises a stimulus generator module 403 which is coupled directly or indirectly to an amplifier 404, which in turn is coupled to a loudspeaker 406.

The stimulus generator module 403 generates an electrical excitation signal and provides the electrical excitation signal to the amplifier 404, which amplifies it and provides the amplified signal to the loudspeaker 406. The loudspeaker 406 generates a corresponding acoustic signal which is output to the user's ear (or ears). The acoustic signal may be sonic or ultra-sonic, for example. The acoustic signal may have a flat frequency spectrum, or be preprocessed in such a way that those frequencies that allow for a good discrimination between individuals are emphasized (i.e. have a higher amplitude than other frequencies).

As noted above, the acoustic signal may be output to all or a part of the user's ear (i.e. the auricle 12a or the ear canal 12b). The acoustic signal is reflected off the ear, and the reflected signal (or echo signal) is detected and received by a microphone 408. The reflected signal thus comprises data which is characteristic of the individual's ear, and suitable for use as a biometric.

The reflected data signal is passed from the microphone 408 to an analogue-to-digital converter (ADC) 410, where it is converted from the analogue domain to the digital domain. Of course, in alternative embodiments the microphone may be a digital microphone and produce a digital data signal (which does not therefore require conversion to the digital domain).

The signal is detected by the microphone 408 in the time domain. However, the features extracted for the purposes of the biometric process may be in the frequency domain (in that it is the frequency response of the user's ear which is characteristic). The system 400 therefore comprises a Fourier transform module 412, which converts the reflected signal to the frequency domain. For example, the Fourier transform module 412 may implement a fast Fourier transform (FFT).

The transformed signal is then passed to a feature extract module 414, which extracts one or more features of the transformed signal for use in a biometric process (e.g. biometric enrolment, biometric authentication, etc). For example, the feature extract module 414 may extract the resonant frequency of the user's ear. For example, the feature extract module 414 may extract one or more mel frequency cepstrum coefficients. Alternatively, the feature extract module may determine the frequency response of the user's ear at one or more predetermined frequencies, or across one or more ranges of frequencies. The extracted features may correspond to data for a model of the ear.

The extracted feature(s) are passed to a biometric module 416, which performs a biometric process on them. For example, the biometric module 416 may perform a biometric enrolment, in which the extracted features (or parameters derived therefrom) are stored as part of biometric data 418 which is characteristic of the individual. The biometric data 418 may be stored within the system or remote from the system (and accessible securely by the biometric module 416). Such stored data 418 may be known as an "ear print". In another example, the biometric module 416 may perform a biometric authentication, and compare the one or more extracted features to corresponding features in the stored ear print 418 (or multiple stored ear prints) for authorised users.

In some embodiments the stimulus waveforms may be tones of predetermined frequency and amplitude. In other embodiments the stimulus generator may be configurable to apply music to the loudspeaker, e.g. normal playback operation, and the feature extract module may be configurable to extract the response or transfer function from whatever signal components the stimulus waveform contains.

Thus in some embodiments the feature extract module 414 may be designed with foreknowledge of the nature of the stimulus, for example knowing the spectrum of the applied stimulus signal, so that the response or transfer function may be appropriately normalised. In other embodiments the feature extract module 414 may comprise a second input to monitor the stimulus (e.g. playback music) and hence provide the feature extract module with information about the stimulus signal or its spectrum so that the feature extract module 414 may calculate the transfer function from the stimulus waveform stimulus to received acoustic waveform from which it may derive the desired feature parameters. In the latter case, the stimulus signal may also pass to the feature extract module 414 via the FFT module 412.

As noted above, the microphone 408 may be operable to detect bone-conducted voice signals. In this case, the biometric algorithm performed by the biometric module 416 may comprise a check that the bone-conducted voice signal (i.e. detected in the microphone 408) and an air-conducted voice signal (i.e. detected in a voice microphone) match to an acceptable degree, i.e. correspond. This will provide an indication that the personal audio device (i.e. that which comprises the microphone 408) is being worn by the same user as is speaking into the voice microphone.

The biometric module 416 thus generates a biometric result 428 (which may be the successful or unsuccessful generation of an ear print, as well as successful or unsuccessful authentication) and outputs the result to the control module 402.

It will be apparent from the discussion above that the biometric module 416 according to embodiments of the disclosure further performs an in-ear detect function. Thus, according to embodiments of the disclosure, the biometric module 416 further generates an output 426 indicative of the presence or absence of an ear (any ear) in proximity to the loudspeaker 406. The in-ear output 426 may also be provided to the control module 402.

Figure 5:
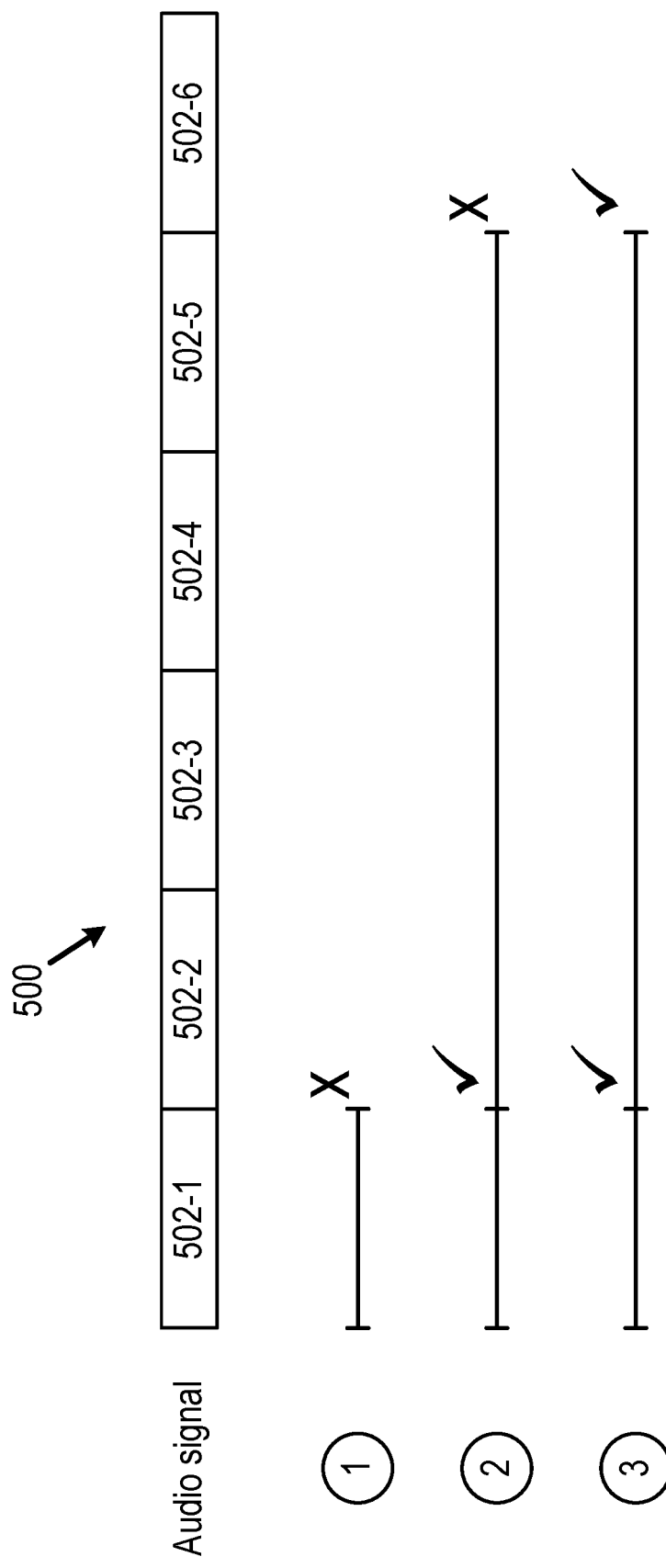
FIG. 5 shows acquisition of an audio signal according to embodiments of the disclosure.

FIG. 5 is a schematic diagram showing the acquisition and use of an audio signal 500 for the purposes of in-ear detection and ear biometric authentication according to embodiments of the disclosure.

Audio signals acquired by personal audio devices described herein may have inherently low signal-to-noise ratios, owing to the relatively low amplitude of ear biometric features. In order to distinguish reliably between an ear of an authorised user and an ear of an unauthorised user, a biometric algorithm may require a relatively large amount of data. This is because the ear biometric features have relatively low amplitude, but also because ear biometrics vary only slightly between different individuals. Therefore, in order to have the necessary confidence that a particular biometric input signal originates from an authorised user, a relatively large amount of data may be required (e.g. averaged over a relatively long time).

In contrast, the differences are more significant between biometric input signals which are indicative of the presence of any ear and biometric input signals which are indicative of the absence of any ear. For example, audio signals acquired in the absence of any ear may have no heartbeat, no resonant frequencies or anti-resonant frequencies, no otoacoustic emissions, etc. Thus, systems and methods according to embodiments of the disclosure may be able to discriminate reliably between the presence and absence of any ear based on relatively little data. In other words, in-ear detection according to embodiments of the disclosure can be performed quickly and consuming relatively little power. In a practical system, it is envisaged that a decision on the presence or absence of any ear may be taken reliably based on 5-10 data frames, whereas a decision on the presence of a particular ear (e.g., that of an authorised user) may be taken reliably based on approximately 100 data frames. In a system having a sample rate of 100 Hz, this would equate to approximately one second of data. Thus approximately 5-10% of the calculations ordinarily required to determine the presence of a particular ear may be required to determine the presence of any ear.

This concept is illustrated in FIG. 5, where an input audio signal 500 comprises a train of data frames 502-n (where n is an integer). Each data frame may comprise one or more data samples.

Three different scenarios are illustrated. In each case, a biometric algorithm is performed based on the audio signal, involving the comparison of biometric features extracted from the audio signal 500 to a template or ear print for an authorised user, and the generation of a biometric score indicating the likelihood that the ear of an authorised user is present. The biometric score may be based on the accumulated data in the audio signal 500, and thus may evolve and converge over time towards a "true" value. The biometric algorithm may comprise one or more different types of ear biometric features, in the latter case fusing the ear biometric scores or decisions as described above.

In the illustrated embodiment, the biometric module first determines whether the audio signal 500 comprises ear biometric features which are indicative of the presence of any ear. The determination may be based on relatively little data. In the illustrated example, the biometric module 416 makes the determination based on a single data frame; however, any number of data frames may be used to make the determination. The determination may involve the comparison of the current biometric score to a threshold $T_1$.

In scenario 1, the biometric module 416 determines that no ear is present, and thus the biometric algorithm ends without further calculations after data frame 502-1. In particular, the biometric module 416 does not go on to determine whether the audio signal 500 comprises ear biometric features which correspond to those of an authorised user. Of course, the algorithm may be repeated in future, e.g., periodically or in response to detection of some event.

In scenario 2, the biometric module 416 determines after data frame 502-1 that an ear is present and, responsive to that determination, goes on to perform a "full" biometric algorithm in order to determine whether the ear belongs to an authorised user or not. This process may require relatively more data, and thus in the illustrated embodiment an authentication decision can only be reliably taken after data frame 502-5. In scenario 2, this determination is negative (i.e. the user is not authorised). Scenario 3 corresponds substantially to scenario 2, but the authentication device is positive (i.e. the user is authorised). In either case, the data on which the authentication decision is taken may comprise more data frames than the data on which the in-ear detect decision is taken. For example, the data may be averaged across all data frames. The determination may involve the comparison of the current biometric score to a threshold $T_2$.

Figure 6:
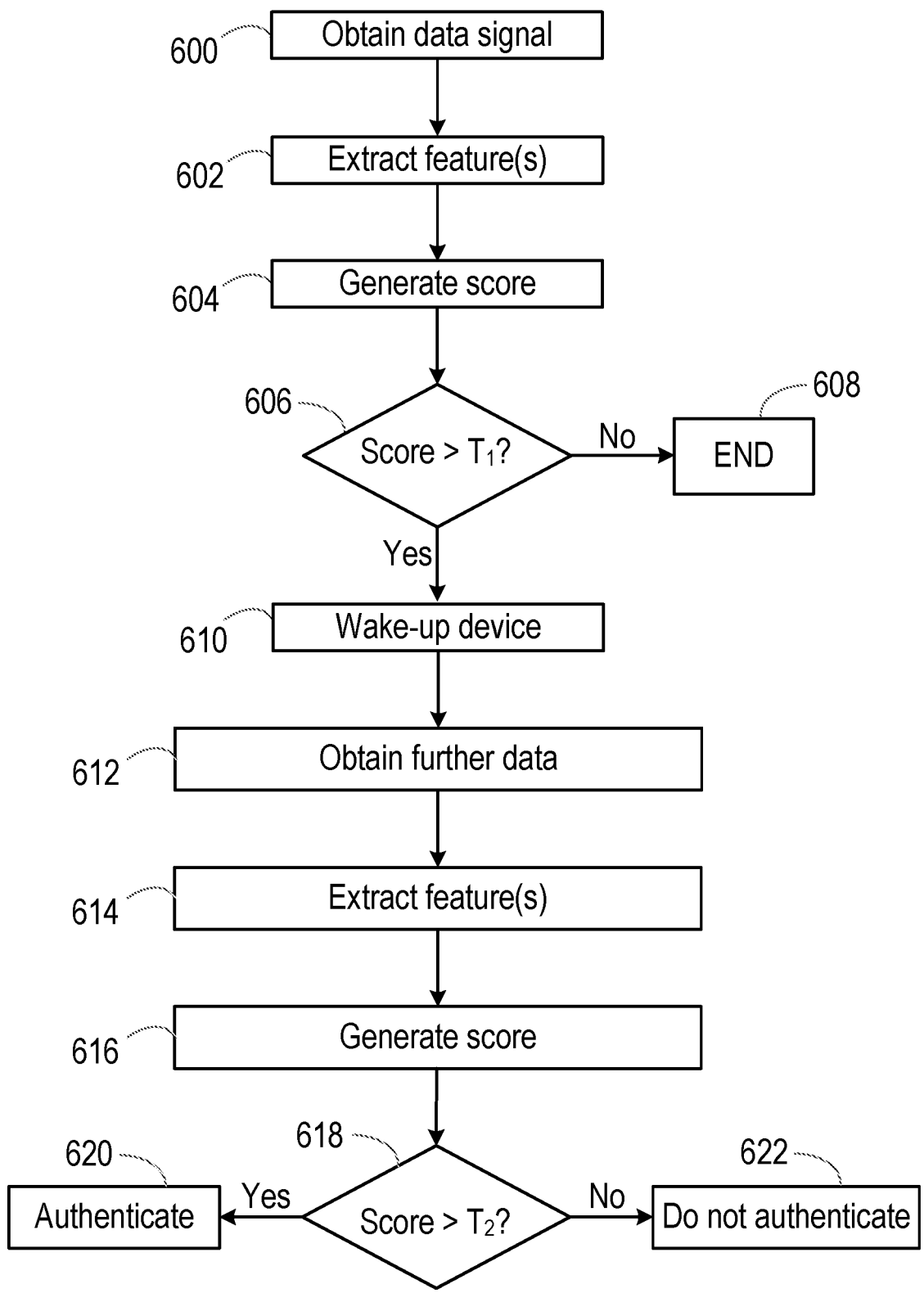
FIG. 6 is a flowchart of a method according to embodiments of the disclosure.

FIG. 6 is a flowchart of a method according to embodiments of the disclosure. The method may be performed by the system 300 described above, for example.

In step 600, the system obtains an audio signal. The audio signal may be acquired by a microphone 408 in a personal audio device, as described above. The audio signal may be obtained in conjunction with generation of an acoustic stimulus (e.g. in order to detect resonant/anti-resonant frequencies, otoacoustic emissions, etc) or not (e.g. when detecting bone-conducted speech, heart rate variability, etc).

In step 602, one or more ear biometric features are extracted from the audio signal. This step may be performed by feature extract module 414, for example. Features in the frequency domain may be extracted following application of a Fourier transform to the audio signal. The ear biometric features may comprise one or more of the following: one or more resonant frequencies; one or more antiresonant frequencies; otoacoustic emissions; heart-rate variability; and bone-conducted voice signals.

In step 604, a biometric algorithm is performed based on the audio signal, involving the comparison of the biometric features extracted in step 602 to a template or ear print for an authorised user, and the generation of a biometric score indicating the likelihood that the ear of an authorised user is present. In the event that more than one type of ear biometric feature is employed, a biometric fusion technique may be used to fuse the ear biometric scores or decisions as described above.

In step 606, the biometric score generated in step 604 is compared to a threshold $T_1$ which is discriminative between scores which are indicative of no ear and scores which are indicative of any ear. If the comparison is negative, the method proceeds to step 608, in which the method ends. Alternatively, a negative in-ear output signal may be generated, indicating the absence of any ear from the proximity of the personal audio device.

If the comparison in step 606 is positive (i.e. an ear is present), a positive in-ear output signal is generated. The system may respond to such an output signal in a number of different ways, and therefore in some embodiments the method may end at that point. That is, the biometric module 416 detects the application of the personal audio device to a user's ear, and the personal audio device or host electronic device responds to such a detection in its usual way. In the illustrated embodiment, the method proceeds to step 610 in which the personal audio device and/or the host electronic device is "woken" from a low-power state (e.g. a sleep or OFF state). However, in other embodiments the personal audio device may react, for example, by locking a touchscreen to further input, by un-pausing audio playback, or in any other way.

Thus embodiments of the disclosure provide methods, apparatus and systems in which a biometric processor or module is used to perform an in-ear detect function.

In further embodiments of the disclosure, the method goes on to perform biometric authentication of the user responsive to detection of the proximity of an ear in step 606. As noted above, biometric authentication may require more data than ear-proximity detection, and thus in step 612 further audio signal data is obtained. For example, one or more additional data frames of the audio signal may be acquired.

In step 614, one or more ear biometric features are extracted from the audio signal data (i.e. the audio signal data acquired in step 600 and/or step 612) and, in step 616, a biometric score is generated indicative of the likelihood that the extracted features match those of a stored template or ear print for an authorised user. Steps 614 and 616 may correspond substantially to steps 602 and 604 described above. The features used to generate the biometric score in step 616 may include the features extracted in step 602 as well as the features extracted in step 614.

In step 618, the score is compared to a threshold $T_2$, which is discriminative between ears of the population at large, and the ear of the authorised user. The threshold $T_2$ is different to the threshold $T_1$ applied in step 606 and, in embodiments where the biometric score is configured to increase with increasing likelihood of a match between input and stored template, is higher than the threshold $T_1$.

If the outcome of the comparison in step 618 is positive, the method proceeds to step 620 in which the user is authenticated as an authorised user; if the outcome of the comparison in step 618 is negative, the method proceeds to step 622 in which the user is not authenticated as an authorised user. Again, the system may response to positive/negative authentication of the user in any manner. For example, a restricted action may be performed or prevented from being performed; settings which are specific to the authorised user may be applied or not. There are many different possibilities and the present disclosure is not limited in that respect.

Thus the present disclosure provides methods, apparatus and systems for performing in-ear detection using a biometric processor or module. By re-using the biometric processor in this way, dedicated circuitry that would otherwise be required for in-ear detect can be left out of the personal audio device or host electronic device altogether.

Embodiments of the disclosure may be implemented in an electronic, portable and/or battery powered host device such as a smartphone, an audio player, a mobile or cellular phone, a handset. Embodiments may be implemented on one or more integrated circuits provided within such a host device. Embodiments may be implemented in a personal audio device configurable to provide audio playback to a single person, such as a smartphone, a mobile or cellular phone, headphones, earphones, etc. See FIGS. 1a to 1e. Again, embodiments may be implemented on one or more integrated circuits provided within such a personal audio device. In yet further alternatives, embodiments may be implemented in a combination of a host device and a personal audio device. For example, embodiments may be implemented in one or more integrated circuits provided within the personal audio device, and one or more integrated circuits provided within the host device.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments and implementations likewise, with the benefit of this disclosure, will be apparent to those having ordinary skill in the art, and such embodiments should be deemed as being encompassed herein. Further, those having ordinary skill in the art will recognize that various equivalent techniques may be applied in lieu of, or in conjunction with, the discussed embodiments, and all such equivalents should be deemed as being encompassed by the present disclosure.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims or embodiments. The word "comprising" does not exclude the presence of elements or steps other than those listed in a claim or embodiment, "a" or "an" does not exclude a plurality, and a single feature or other unit may fulfil the functions of several units recited in the claims or embodiments. Any reference numerals or labels in the claims or embodiments shall not be construed so as to limit their scope.

The invention claimed is:

1. A system for detecting the presence of an ear in proximity to an audio device, the system comprising:
    an input for obtaining an audio data signal from a transducer of the audio device; and
    an ear biometric authentication module configured to:
        compare one or more ear biometric features, extracted from the audio data signal, to an ear biometric template of an authorised user;
        calculate one or more scores based on the comparison, the one or more scores being indicative of a distance between the one or more extracted ear biometric features and the ear biometric template;
        compare the same one or more scores to each of a first threshold and a second thresholds, wherein the first and second thresholds are different to each other;
        generate a first output indicative of the presence or absence of any ear in proximity to the audio device based on the comparison of the same one or more scores to the first threshold; and
        generate a second output indicative of the presence or absence of an ear of the authorised user in proximity to the audio device based on the comparison of the same one or more scores to the second threshold;
    wherein the one or more biometric features comprises one or more of: one of more resonant frequencies; one or more anti-resonant frequencies; oto-acoustic emissions; heart-rate variability; bone-conducted signals.

2. The system according to claim 1, wherein the data signal comprises a plurality of data frames, each data frame comprising a plurality of data samples.

3. The system according to claim 2, wherein the one or more ear biometric features are averaged over multiple data frames.

4. The system according to claim 2, wherein the first output is based on one or more extracted ear biometric features calculated from a first number of data frames, wherein the ear biometric authentication module is further configured to generate the second output based on the comparison of one or more ear biometric features extracted from a second number of data frames, greater than the first number, to the ear biometric template for the authorised user.

5. The system according to claim 1, wherein the second output is generated responsive to a determination that any ear is in proximity to the audio device.

6. The system according to claim 1, wherein the extracted ear biometric features comprise a plurality of different types of ear biometric feature, and wherein the ear biometric authentication module is operative to apply a biometric fusion technique to generate the first output.

7. The system according to claim 1, wherein the data signal is an audio signal.

8. An electronic device, comprising: the system as claimed in claim 1.

9. The electronic device according to claim 8, wherein the electronic device is the audio device.

10. The electronic device according to claim 8, wherein the electronic device is a host device coupled to the audio device.

11. A method of detecting the presence of an ear in proximity to an audio device, the method comprising:
    comparing one or more ear biometric features, extracted from an audio data signal obtained from a transducer of the audio device, to an ear biometric template of an authorised user;
    calculating one or more scores based on the comparison, the one or more scores being indicative of a distance between the one or more extracted ear biometric features and the ear biometric template;
    comparing the same one or more scores to each of a first threshold and a second threshold, wherein the first and second thresholds are different to each other;
    generating a first output indicative of the presence or absence of any ear in proximity to the audio device based on the comparison of the same one or more scores to the first threshold; and
    generating a second output indicative of the presence or absence of an ear of the authorised user in proximity to the audio device based on the comparison of the same one or more scores to the second threshold;
    wherein the one or more biometric features comprises one or more of: one of more resonant frequencies; one or more anti-resonant frequencies; oto-acoustic emissions; heart-rate variability; bone-conducted signals.

12. The method according to claim 11, wherein the second output is generated responsive to a determination that any ear is in proximity to the audio device.

13. The method according to claim 11, wherein the data signal comprises a plurality of data frames, each data frame comprising a plurality of data samples.

14. The method according to claim 13, wherein the one or more ear biometric features are averaged over multiple data frames.

15. The method according to claim 13, wherein the first output is based on one or more extracted ear biometric features calculated from a first number of data frames, and wherein the second output is generated based on the comparison of one or more ear biometric features extracted from a second number of data frames, greater than the first number, to the ear biometric template for the authorised user.

16. The method according to claim 11, wherein the extracted ear biometric features comprise a plurality of different types of ear biometric feature, and wherein the method further comprises applying a biometric fusion technique to generate the first output.

17. The method according to claim 11, wherein the data signal is an audio signal.

* * * * *

UNITED STATES PATENT AND TRADEMARK OFFICE
CERTIFICATE OF CORRECTION

PATENT NO. : 11,693,939 B2  
APPLICATION NO. : 17/036223  
DATED : July 4, 2023  
INVENTOR(S) : John Paul Lesso Page 1 of 1

It is certified that error appears in the above-identified patent and that said Letters Patent is hereby corrected as shown below:

In the Claims

1. In Column 16, Line 10, in Claim 1, delete "one of" and insert -- one or --, therefor.

2. In Column 16, Line 67, in Claim 11, delete "one of" and insert -- one or --, therefor.

Signed and Sealed this  
Twenty-fourth Day of October, 2023

Katherine Kelly Vidal  
*Director of the United States Patent and Trademark Office*